Patented Mar. 17, 1953

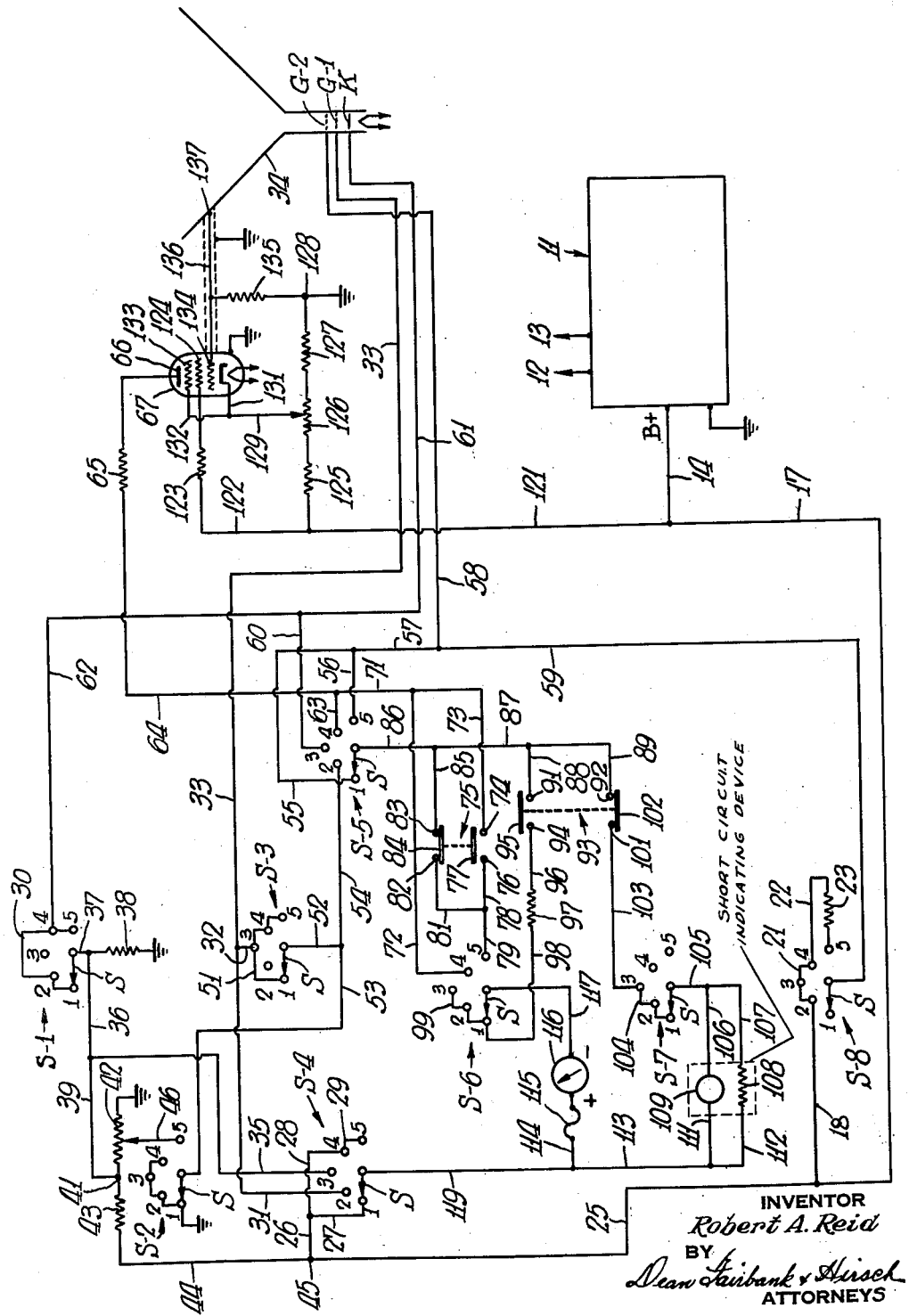

2,632,134

UNITED STATES PATENT OFFICE 2,632,134

CATHODE-RAY TUBE TESTER

Robert A. Reid, Belleville, N. J., assignor to Thomas Electronics, Inc., a corporation of New Jersey Application February 7, 1951, Serial No. 209,715

7 Claims. (Cl. 315—367)

This invention relates to tube testers, particularly of the type to test cathode ray tubes.

As conducive to an understanding of the invention it is noted that in cathode ray tubes the vacuum is much greater than in conventional vacuum tubes and hence there are less gas molecules present. This is essential in cathode ray tubes for if there should be a large number of gas molecules, the resultant gas current would cause the total current flow through the tube to be greater than in the case of a pure electron discharge from the cathode. As the characteristics of a gas filled tube are not constant, the operation of such a tube would be irregular which is objectionable in cathode ray tubes where smooth response is essential for undistorted reproduction of the images being televised.

As the gas current in ordinary vacuum tubes is relatively great, there is no need for a sensitive meter in conventional tube testers to determine such current. Consequently stray currents due to hand capacitance, dirt on the tube or moisture in the air, will have little effect on such meter.

However, in the case of cathode ray tubes where a very sensitive indicating device is required to measure the minute gas current, such stray currents will also be indicated and unless they can be compensated for without affecting the sensitivity of the indicating device, the gas current reading will be unreliable.

It is accordingly among the objects of the invention to provide a cathode ray tube tester that is neat, compact and not likely to become out of order, which will indicate even minute gas currents and will compensate for stray currents due to hand capacitance, dirt on the tube, moisture in the air or the like without decreasing sensitivity of the meter to such minute gas currents.

According to one aspect of the invention, the tube tester includes a vacuum tube amplifier which is connected in circuit with the cathode ray tube, a meter and a source of potential and which may be adjusted to compensate for stray currents through the cathode ray tube so that a predetermined current will flow through the meter. The tester is so designed that the meter may be switched into circuit with the accelerating grid of the cathode ray tube which functions as a plate, to indicate the emission from the cathode and such emission may be regulated to a desired amount so that when the amplifier is switched into series with the meter and the anode of the cathode ray tube which is negative with respect to the cathode, a gas current indication will be given based on said predetermined emission.

The tester, through suitable switching circuits, is designed to test short circuits and leakage between the control grid, the accelerating grid or the cathode and any of the other elements of the tube.

In the accompanying drawings in which are shown one or more of various possible embodiments of the various features of the invention, the single figure is a circuit diagram of the equipment.

Referring now to the drawing, the cathode ray tube tester desirably includes a conventional power supply 11 which may be connected to a source of alternating potential. The power supply which may have an output of 350 volts, has an output lead 14 by means of which positive potential is supplied and also has a pair of leads 12 and 13 to supply the filaments of the tubes used in the tester and the cathode ray tube being tested.

As the power supply may be of any suitable conventional design utilizing standard components, it will not be further described.

The tester desirably comprises a plurality of switches S-1 to S-8 inclusive, said switches each having a movable contact arm S, ganged together so as to move in unison upon rotation of a suitable control knob (not shown), and a plurality of fixed contacts, illustratively five in number designated 1 to 5 inclusive. As shown in the drawing, the output lead 14 from the power supply 11 is connected by leads 17 and 18 to contact 2 of switch S-8, which is connected to contacts 3 and 4 by lead 21. Contact 4 of switch S-8 is connected by lead 22 to one side of resistor 23, illustratively of 68 ohms, the other side of said resistor being connected to contact 5 of switch S-8.

Lead 14 from the power supply is connected by leads 17, 25, 26 and 27 to contact 1 of switch S-4, which in turn is connected to contacts 4 and 5 by leads 28 and 29. Contact 2 of switch S-4 is connected by leads 31 and 32 to contact 3 of switch S-3, and by leads 31 and 33 to the control grid G-1 of the cathode ray tube 34, which is desirably mounted in a suitable socket (not shown) which forms part of the tube tester. Contact 3 of switch S-4 is connected by leads 35, 36 and 37 to movable switch arm S of switch S-1, the contacts 1, 2, 4 and 5 of said switch S-1 being connected by common lead 30, said switch having a "dead" contact 3. Contact 3 of switch S-4 is connected by leads 35 and 36 to one side of resistor 38 which illustratively has a value of 10,000 ohms and has its other side connected to ground, and by leads 35 and 39 to the junction 41 between resistors 42 and 43. Desirably resistor 42 is a potentiometer having a value of 100,000 ohms, connected at one end to resistor 43, which may have a value of 20,000 ohms, as at 41 and at its other end to ground, the free end of resistor 43 being connected by lead 44 to the junction 45 between leads 25 and 26. The movable arm 46 of potentiometer 42 is desirably connected to contact 5 of switch S-2. The contact 1 of switch S-2 is desirably connected to ground, and the contacts 2, 3 and 4 of switch S-2 are connected by common lead 49 to contact 1 and thence to ground. The contacts 1, 3, 4 and 5 of switch S-3 are connected by common lead 51, said switch S-3 desirably having a "dead" contact 2. The switch arm S of switch S-3 is connected by leads 52 and 53 to the switch arm S of switch S-2 and by leads 52 and 54 to fixed contact 2 of switch S-5. The contact 1 of switch S-5 is connected by leads 55 and 56 to contact 5 of switch S-5; by leads 55, 57 and 58 to the accelerating grid G-2 of the cathode ray tube 34, and by leads 55, 57 and 59 to switch arm S of switch S-8. The contact 3 of switch S-5 is connected by leads 60 and 61 to the cathode K of tube 34 and by leads 60 and 62 to fixed contact 4 of switch S-1. Contact 4 of switch S-5 is connected by leads 63 and 64 to one side of plate load resistor 65, illustratively of 100,000 ohms, the other side of which is connected to the plate 66 of vacuum tube 67, which forms part of an amplifier circuit and is desirably a type 6AC7 tube.

Contact 4 of switch S-5 is also connected by leads 63, 71 and 72 to contact 4 of switch S-6 and by leads 63, 71 and 73 to contact 74 of a ganged pair of pushbutton two point make and break switches 75. The associated contact 76 of said switch, which is normally disconnected from contact 74 by reason of the spaced jumper arm 77, is connected by leads 78 and 79 to contact 5 of switch S-6, said contact 5 being connected by leads 79 and 81 to the contact 82 of the switch 75. The contact 83 associated with contact 82 and normally connected thereto by jumper arm 84, is connected by leads 85 and 86 to the movable switch arm S of switch S-5. Arm S of switch S-5 is connected by leads 86, 87 which latter branches into leads 88 and 89, to contacts 91 and 92 respectively, of a ganged pair of pushbutton two point make and break switches 93. The contact 94 associated with contact 91 and normally disconnected therefrom by reason of the spaced jumper arm 95, is connected by lead 96 to one side of a resistor 97, illustratively of 750,000 ohms, the other side of said resistor being connected by lead 98 to contact 1 of switch S-6, said contact 1 being connected to contacts 2 and 3 by common lead 99. The contact 101 of switch 93 associated with contact 92 and normally connected thereto by jumper arm 102, is connected by lead 103 to contact 3 of switch S-7, said contact 3 being connected to contacts 1 and 2 by common lead 104. As shown, the contacts 4 and 5 of switch S-7 are "dead" contacts. The movable switch arm S of switch S-7 is connected by leads 105, 106 and 107 to one side of neon lamp 109 and to one side of resistor 108, illustratively of 3.9 megohms. As shown, said resistor 108 and lamp 109 are connected in parallel with their other sides being connected by leads 111, 112, 113 and 114 to one side of fuse 115, the other side of which is connected to one side of a current indicating meter 116, preferably a microammeter, the other side of which is connected by lead 117 to switch arm S of switch S-6. Desirably lead 113 is also connected by lead 119 to switch arm S of switch S-4.

The output lead 14 of the power supply 11 is desirably connected by leads 121 and 122 to one end of a resistor 123, illustratively of 47,000 ohms, the other end of which is connected to the screen grid 124 of vacuum tube 67 which forms part of a conventional amplifier circuit. Lead 121 is also connected to one end of a resistor network including series connected resistors 125, 126 and 127 illustratively of 100,000 ohms, 5,000 ohms and 4,700 ohms respectively, the end of said series connected resistors being connected to ground as at 128.

Resistor 126 is desirably a potentiometer, the movable arm 129 of which is connected to the cathode 131 of tube 67, said cathode being connected in conventional manner by lead 132 to the suppressor grid 133 of said tube. The control grid 134 of tube 67 is connected through resistor 135, illustratively of 10 megohms, to ground as at 128 and is also connected by shielded lead 136 to the anode connection 137 of the cathode ray tube 34.

*Operation*

To use the testing equipment the cathode ray tube 34 is plugged into the socket (not shown) and the shielded lead 136 connected to the anode terminal 137 of tube 34. The switches S-1 to S-8 are set to position four in which the ganged movable switch arms S are respectively engaging the contacts 4 of the switches. The power supply is then turned on which will apply voltage to the filaments of the cathode ray tube 34 and to the tube 67. Simultaneously a positive potential of 350 volts will be applied to grid G-2 of cathode ray tube 34, the circuit being from output lead 14 of the power supply, leads 17, 18 and 21, contact 4 of switch S-8, switch arm S which is engaging said contact, leads 59 and 58 to grid G-2.

A positive potential will also be applied from lead 14 through leads 17 and 25, junction 45, leads 26 and 28, contact 4 of switch S-4, movable arm S thereof which is engaging said contact 4, leads 119 and 114, fuse 115, through meter 116, lead 117 to switch arm S of switch S-6 which is engaging contact 4 thereof and thence from contact 4 through leads 72, 71 and 64, plate load resistor 65 to the plate 66 of tube 67.

The cathode K of the cathode ray tube 34 will have a positive potential applied thereto from lead 14, 17 and 25, junction 45, lead 44, resistor 43, potentiometer 42 to ground and from junction 41 through leads 39, 36, 37 to switch arm S of switch S-1 which is engaging contact 4 thereof, and from contact 4 through leads 62 and 61 to cathode K.

As a result of the voltage drop across resistor 43 and the parallel connected resistors 42 and 38, with an applied voltage of 350 volts, 110 volts will be applied to cathode K. This voltage may readily be calculated as follows: The value of parallel connected resistors 42 and 38 which are respectively 100,000 ohms and 10,000 ohms is 9,090 ohms. This combined value in series with resistor 43, which has a value of 20,000 ohms, give a total value of 29,090 ohms which at an applied voltage of 350 volts gives .012 amps. Thus, there will be a drop of 240 volts across resistor 43 and approximately 110 volts across the parallel connected resistors 42 and 38.

The grid G-1 of the cathode ray tube 34 will be connected to ground from lead 33, 32 and 51, contact 4 of switch S-3 which is engaged by arm S thereof, leads 52 and 53 to arm S of switch S-2 which engages contact 4 thereof and thence through lead 49 to contact 1 of switch S-2 which is connected to ground. With the cathode at 110 volts positive as previously described and the control grid at ground or zero potential, the control grid will be at 110 volts negative with respect to the cathode and consequently, the cathode ray tube 34 will be biased to cut off and no current will flow from the cathode K to the accelerating grid G-2 which functions as a plate.

Positive potential will also be applied to the screen grid 124 of tube 67 from leads 14, 121 and 122, resistor 123 to screen grid 124. The value of such voltage will be approximately 350 volts as little or no screen grid current will flow. The cathode 131 of tube 67 will be biased from lead 14 and 121 through series connected resistors 125, 126 and 127 to ground as at 128, the bias being adjustable by means of the resistor 126 which is a potentiometer having its movable arm 129 connected to cathode 131.

With the tube tester in position 4 which forms the circuits above described, the cathode ray tube 34 will be substantially non-conducting and the tube 67 will conduct, the current flow therethrough being measured by meter 116 in series with plate 66 of tube 67. Such current reading is desirably adjusted by rotating the potentiometer arm 129 to vary the bias on tube 67 until a reading of 10 microamperes is indicated on meter 116 which, with a 6AC7 type tube, will enable the latter to function on the linear portion of its amplification curve for linear response. This ten microamperes of current flow is correlated with a "zero" indication on the dial of meter 116.

The "zeroing" of the meter 116 above described, so that it will function on the linear portion of the tube 67, is also necessary to compensate for anode leakage current from cathode ray tube 34 due to, for example, hand capacitance, moisture in the air or dirt on the tube. The meter 116 and associated amplifier tube 67 which must be sensitive enough to measure the minute currents due to gas in the cathode ray tube 34 would also be sensitive enough to amplify such stray currents and the "zeroing" of the meter is intended to compensate for such factors.

After the testing equipment is "zeroed" as above described, the cathode ray tube 34 may be tested for emission of electrons from the cathode K. This is accomplished by rotating movable switch arms S until they are in position five engaging contacts 5 of switches S-1 to S-3 respectively.

With the equipment in position five, the grid G-1 of cathode ray tube 34 is connected by leads 33, 32 and 51 to contact 5 of switch S-3, which is engaged by switch arm S thereof, thence through leads 52, and 53, switch arm S of switch S-2, contact 5 thereof, movable arm 46 of potentiometer 42, resistor 43, leads 44, 25, 17 and 14 to the power supply. The cathode K of the cathode ray tube 34 will be connected to the power supply 11 from leads 14, 17, 25 and 44, resistor 43, junction 41, leads 39, 36 and 37, switch arm S of switch S-1, contact 5 thereof, lead 30 to contact 4, leads 62 and 61 to cathode K. Consequently, as previously described, the cathode K will have a positive potential of approximately 110 volts applied thereto and grid G-1 will have a potential thereon of more than 110 volts as parallel connected resistors 42 and 38 have a voltage of 240 volts thereacross as previously described.

Grid G-2 of the cathode ray tube 34 will be connected to the power supply 11, the circuit being from leads 14, 17 and 18, fixed contact 2 of switch S-6, lead 21, contact 4 of said switch, lead 22 through resistor 23, which has a value of 68 ohms, contact 5, switch arm S, leads 59 and 58 to grid G-2. Simultaneously the meter 116 will be connected in parallel with resistor 23, the circuit being from main 14, leads 17 and 25, junction 45, leads 26 and 28, contact 4 of switch S-4 which is connected by lead 29 to contact 5 thereof and thence from switch arm S which engages contact 5, through leads 119 and 114, fuse 115, meter 116, lead 117 to switch arc S of switch S-6, contact 5 engaged thereby, leads 79 and 81, bridged contacts 82 and 83 of push button switch 75, leads 85 and 86, switch arm S of switch S-5, contact 5 engaged thereby and leads 56, 57 and 58 to grid G-2. As resistor 23 is of relatively low value with respect to the resistance of meter 116, substantially all of the current will pass through said resistor 23 and with this arrangement the meter 116 is calibrated to have a scale reading of zero to one milliampere.

With the circuit above described, the grid G-2 of the cathode ray tube will function as an anode so that the electrons emitted by the cathode K will flow to the grid G-2 to be indicated on the meter 116.

The potentiometer 42 which controls the bias on grid G-1 of the cathode ray tube is thereupon adjusted so that one-half a ma. of current will flow through such tube which will be indicated on meter 116. If the potentiometer cannot be adjusted sufficiently so that one-half a ma. is indicated on meter 116 the tube is of low emission and should be discarded.

In position five above described, the plate 66 of the vacuum tube 67 is disconnected from the meter circuit due to the normally open contacts 74 and 76 of pushbutton switch 75. To test for gas in the cathode ray tube with the switches S-1 to S-6 still in position five, it is merely necessary to press pushbutton switch 75. This will open contacts 82, 83 and close contacts 74, 76 thereof.

The opening of contacts 82, 83 disconnects grid G-2 of cathode ray tube 34 from meter 116. The closing of contacts 74, 76 connects meter 116 in series with the power supply 11 and the plate 66 of tube 67. The circuit is from power supply 11, leads 14, 17, 25, 26, 28, contact 4 of switch S-4, lead 29, contact 5, switch arm S, leads 119 and 114, fuse 115, meter 116, lead 117, switch arm S of switch S-6 which engages contact 5, leads 79 and 78, bridged contacts 76, 74, leads 73, 71 and 64, plate load resistor 65 to plate 66. With the circuit above described, the resistor 23 is no longer in parallel with meter 116 and hence the total current from tube 67 will flow through the meter which is also calibrated to read from zero to one hundred microamperes.

As the cathode ray tube 34 is conducting as previously described, the electrons will flow from the cathode K to grid G-2 which functions as an anode. The flow of electrons will bombard the gas molecules in the cathode ray tube 34, causing additional electrons to be emitted by the gas molecules thereby making such molecules positive ions. As the cathode K of tube 34 is at approximately 110 volts positive potential as previously described, while the anode 137, which is connected through resistor 135 to ground 128, is substantially at ground potential the anode will be negative with respect to the cathode. Consequently, the positive gas ions will be attracted by the negative anode 137 of the tube 34 which is connected to the control grid 134 of tube 67 by lead 136. The flow of the positive gas ions to the negative anode will cause a current flow through resistor 135 to ground with resultant voltage drop across said resistor 135, which will be impressed on the grid 134 of tube 67 and the resultant amplified signal will be indicated on meter 116 as the gas current of tube 34.

As the cathode ray tube 34 has been set up so that it will have an emission of one-half ma., the meter 116 desirably is marked so that the ratio of the gas current to the emission current will be indicated directly on the meter. This ratio should be approximately .25 for efficient tube operation. Thus, if the gas current is .000125 ampere and the emission current is .0005 ampere or one-half ma., the ratio will be .25.

Having thus tested the tube for emission and gas, tests may be made for short circuit and leakage between grid G-2 and the other elements of the tube by moving the switch arm S of switches S-1 to S-8 to position one. In position one, the grid G-2 of cathode ray tube 34 is connected through leads 58, 57 and 55, contact 1 of switch S-5, switch arm S thereof which engages contact 1, leads 86, 87 and 89, bridged contacts 92 and 101, lead 103, contact 3 of switch S-7, lead 104, contact 1, switch arm S, lead 105, leads 106, 107 through neon lamp 109 and resistor 108 respectively, which function as a short circuit indicating device, leads 111 and 112, respectively, leads 113 and 119, switch arm S of switch S-4 which is engaging contact 1 thereof, leads 27, 26, 25, 17 and 14 to power supply 11. Grid G-1 of tube 34 is connected to ground through leads 33, 32 and 51, contact 1 of switch S-3, switch arm S thereof, leads 52 and 53, switch arm S of switch arm S-2 which is engaging contact 1 thereof, which is connected to ground. Thus, by the grounding of grid G-1, cathode ray tube 34 is cut off as the grid will be at 110 volts negative with respect to the cathode K which has 110 volts positive potential thereon from power supply 11, leads 14, 17, 25, 44, resistor 43, leads 39, 36 and 37, switch arm S of switch S-1, contact 1, lead 30, contact 4, leads 62 and 61 to cathode K.

If there should be a short circuit between grid G-2 and any other element of the tube, say for example, grid G-1, a complete circuit would be provided between the positive side of the power supply and ground. Consequently, the current flowing through resistor 108 will effect a voltage drop thereacross which will cause neon lamp 109 in parallel therewith to light.

In the event neon lamp 109 does not light, a more sensitive leakage test may be made between grids G-2 and the other elements in the cathode ray tube. This is accomplished in position one, by merely pushing the pushbutton switch 93 so that the contacts 91 and 94 thereof will be bridged by jumper arm 95 and the contacts 92 and 101 thereof will be disconnected. The disconnection of contacts 92 and 101 will remove neon lamp 109 and resistor 108 from circuit and the meter 116 will be placed in circuit in series with grid G-2 and the positive power supply. The circuit is from power supply 11, leads 14, 17, 25, 26 and 27, contact 1 of switch S-4, arm S thereof, leads 119 and 114, fuse 115, meter 116, lead 117, switch arm S of switch S-6, contact 1, lead 98, resistor 97, lead 96, bridged contacts 91, 94, leads 88, 87 and 86, switch arm S of switch S-5 which engages contact 1 thereof and leads 55, 57 and 58 to grid G-2.

As a result of the above circuit, as the cathode ray tube is cut off, any current flow indicated by meter 116 will be caused by leakage current flowing between grid G-2 and any other element of the tube.

Where it is desired to test in order to see if grid G-1 is shorted to any other element in the tube 34, the switch arms S are moved to position two. As a result, grid G-2 will be connected directly to power supply through leads 58 and 59, switch arm S of switch S-8, contact 2 thereof, leads 18, 17 and 14 to the power supply. The grid G-1 will be connected through leads 33 and 31 to contact 2 of switch S-4 and thence through switch arm S thereof which is engaging contact 2 through leads 119, 113, 111 and 112 which are respectively connected to one side of neon lamp 109 and resistor 108, leads 106 and 107, lead 105, switch arm S of switch S-7, contact 2, leads 104 and 103, bridged contacts 101, 92, leads 89, 87 and 86, switch arm S of switch S-5, contact 2 engaged thereby, leads 54 and 53, switch arm S of switch arm S-2, contact 2, lead 49 to contact 1 which is connected to ground.

As a result of such circuit if there is a short circuit between grid G-1, which is connected to ground and any of the other element of the tube which are at a higher potential such as, for example, grid G-2 which is connected to the positive power supply or the cathode K which has 110 volts positive potential applied thereto as previously described, current will flow through resistor 108 and neon lamp 109 in parallel therewith.

In the event that the neon lamp 109 is not illuminated the more sensitive leakage test is made by pressing push button switch 93 which closes the normally open contacts 91, 94 thereof and opens normally closed contacts 92, 101. The closing of contacts 91, 94 puts meter 116 in series with grid G-1 and ground and the opening of contacts 101, 92 disconnects neon lamp 109 and resistor 108.

The circuit for meter 116 is from grid G-1, leads 33 and 31, contact 2 of switch S-4, contact arm S in engagement therewith, leads 119 and 114, fuse 115, meter 116, lead 117, arm S of switch S-6, contact 2, leads 99, 98, resistor 97, lead 96, bridged contacts 94 and 91, leads 88, 87 and 86, switch arm S of switch S-5 which engages contact 2 thereof, leads 54 and 53, switch arm S of switch S-2 which is engaging contact 2, lead 49, contact 1 to ground. As tube 34 is cut off in position two, in the event of any leakage current between grid G-1 which is connected to ground and any other element of the tube 34 which is at a higher potential, such current will be indicated on meter 116.

To test for short circuit or leakage from cathode K of tube 34 to any other element in the tube the movable switch arms S are rotated to position three. In this position the cathode K will be connected through leads 61 and 60, contact 3 of switch S-5, switch arm S, leads 86, 87 and 89, bridged contacts 92, 101 of switch 93, lead 103 to contact 3 of switch S-7, contact arm S in engagement therewith, leads 105 and 106, 107 to neon lamp 109 and resistor 108 in parallel therewith, leads 111, 112 and 113, 119, switch arm S of switch S-4 which engages contact 3, leads 35 and 39 to junction 41 between resistors 42 and 43 and thence by leads 44, 25, 17 and 14 to the power supply.

As a result of the above circuit, the cathode K will have 110 volt positive potential applied thereto as previously described. The grid G-1 of tube 34 is connected to ground through leads 33 and 32, contact 3 of switch S-3, contact arm S, leads 52 and 53, arm S of switch S-2, contact 3, lead 49 to contact 1, and thence to ground. The grid G-2 of tube 34 is connected directly to the power supply 11 through leads 52 and 59, switch arm S of switch S-8, contact 3, lead 21, contact 2, leads 18, 17 and 14.

Consequently, if the cathode K should be short circuited, for example, to grid G-1, which is at ground potential, current will flow through resistor 108 and neon lamp 109 will be illuminated. To make a leakage test it is merely necessary to press pushbutton switch 93. This will connect meter 116 in series with the cathode K and the power supply 11 to indicate the leakage current and will disconnect neon lamp 109 and resistor 108 from the circuit.

With the circuits above described, a highly efficient cathode ray tube tester is provided which is compact, sturdy and has but few parts and which will accurately measure minute gas currents as well as considerably larger emission and leakage currents, yet does not decrease the sensitivity of the meter and its associated amplifier in order that stray currents will not be amplified, but rather compensates for such stray currents.

As many changes could be made in the above construction, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. An equipment for testing cathode ray tubes comprising a meter for determining current flow, an amplifier associated with said meter and including a vacuum tube, means for connecting the elements of such cathode ray tube to said tester, said means including a lead from the anode of such cathode ray tube to the control grid of said vacuum tube, means for connecting said meter in the plate circuit of said vacuum tube, means for biasing such cathode ray tube to cut off, means for regulating the current flow through said meter to a predetermined amount, means for applying conducting bias to such cathode ray tube and for switching said meter to the accelerating grid circuit of such cathode ray tube to determine the emission of such tube, means for switching said meter to the plate circuit of said vacuum tube when such cathode ray tube is conducting to determine the gas current thereof, a short circuit indicating device, means to switch said device into circuit with at least one of the elements of such cathode ray tube while simultaneously biasing the latter to cut off and switch means to connect said meter in circuit with said element and disconnect said short circuit indicating device thereby to determine leakage current.

2. The combination set forth in claim 1 in which said short circuit indicating device comprises a neon lamp and a resistor in parallel with said neon lamp, whereby when current flows through said resistor the voltage thereacross will be applied across said lamp to illuminate the latter.

3. A cathode ray tube tester comprising a meter for determining current flow, an amplifier including a vacuum tube associated with said meter, means for connecting the elements of a cathode ray tube to said tester, said means including a lead from the anode of said cathode ray tube to the control grid of said vacuum tube, a resistor connected at one end of the control grid of said vacuum tube and at its other end to ground, a source of energizing potential for said vacuum tube and said cathode ray tube, means simultaneously to connect said meter in series with the plate circuit of said vacuum tube and a source of positive potential; to apply a positive potential to the accelerating grid of said cathode ray tube; to apply a lower positive potential to the cathode of said cathode ray tube, and to bias said cathode ray tube to cut off, a source of biasing potential for said vacuum tube, means to regulate said biasing potential to adjust the current flow through said meter from said vacuum tube and said cathode ray tube to a predetermined amount, means for switching said meter from the plate circuit of said vacuum tube, in series with the accelerating grid of said cathode ray tube and a source of positive potential and simultaneously to bias the cathode ray tube so that it will conduct, whereby said meter will indicate the emission of said cathode ray tube and means to switch said meter to the plate circuit of said vacuum tube whereby said meter will indicate the gas current in said cathode ray tube.

4. The combination set forth in claim 3 in which a resistor of relatively low ohmic value with respect to the ohmic value of said meter is in parallel therewith when said meter is in series with the accelerating grid of said cathode ray tube.

5. The combination set forth in claim 3 in which means are provided to adjust the bias on said cathode ray tube to set the emission thereof to a predetermined amount whereby the ratio between gas current and the emission based on said predetermined amount of emission may be ascertained.

6. The combination set forth in claim 3 in which the means simultaneously to connect said meter in series with the plate circuit of said vacuum tube and a source of positive potential to apply a positive potential to the accelerating grid of said cathode ray tube, to apply a lower positive potential to the cathode of said cathode ray tube and to bias said cathode ray tube to cut off comprises a first switch having a fixed contact connected to said plate and a movable arm connected to one side of said meter, a second switch having a movable arm connected to the other side of said meter and a fixed contact connected to a source of positive potential, a third switch having a movable arm connected to said accelerating grid and a fixed contact connected to a source of positive potential, a fourth switch having a fixed contact connected to said cathode, a movable contact arm and a voltage divider in circuit with said movable arm and a source of positive potential, said movable arms being gauged to move in unison to engage the associated contacts.

7. The combination set forth in claim 3 in which a ganged pair of push button two point make and break switches are provided, each having a pair of contacts and a jumper arm, one of said jumper arms normally engaging its associated contacts to close the associated switch and the other jumper arm being spaced from its associated contact to open the associated switch, one of the contacts of each of said switches being connected together and to one side of said meter, the other contact of said closed switch being connected to the source of positive potential and to the accelerating grid of such cathode ray tube and the other contact of said open switch being connected to the plate of said vacuum tube whereby upon actuation of said switches, said meter will be connected to the plate circuit of said vacuum tube and disconnected from the accelerating grid circuit thereof.

ROBERT A. REID.

REFERENCES CITED

The following references are of record in the file of this patent:

UNITED STATES PATENTS

| Number | Name | Date |
|---|---|---|
| 1,668,748 | Whiting et al. | May 8, 1928 |
| 2,075,415 | Williams | Mar. 30, 1937 |
| 2,092,896 | Stinchfield | Sept. 14, 1937 |
| 2,172,953 | Buchard | Sept. 12, 1939 |
| 2,198,242 | Buchard | Apr. 23, 1940 |
| 2,444,036 | Crost | June 29, 1948 |
| 2,560,952 | Herold | July 17, 1951 |